United States Patent
Kim

(10) Patent No.: US 10,156,637 B2
(45) Date of Patent: Dec. 18, 2018

(54) APPARATUS AND METHOD FOR CONTROLLING NOISE IN VEHICLE

(71) Applicant: HYUNDAI MOTOR COMPANY, Seoul (KR)

(72) Inventor: Hyun Joo Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/333,811

(22) Filed: Oct. 25, 2016

(65) Prior Publication Data

US 2017/0133001 A1 May 11, 2017

(30) Foreign Application Priority Data

Nov. 10, 2015 (KR) .......................... 10-2015-0157400

(51) Int. Cl.
  *G10K 11/178* (2006.01)
  *G01S 19/13* (2010.01)

(52) U.S. Cl.
  CPC ............ *G01S 19/13* (2013.01); *G10K 11/178* (2013.01); *G10K 2210/1282* (2013.01)

(58) Field of Classification Search
  CPC ....... G10K 2210/1282; G10K 2210/00; G10K 11/1786; G10K 11/1788
  USPC ................................................ 381/71.1, 71.4
  See application file for complete search history.

(56) References Cited

U.S. PATENT DOCUMENTS

| 7,020,288 | B1 * | 3/2006 | Ohashi | G10K 11/178 |
| | | | | 381/71.4 |
| 9,293,135 | B2 * | 3/2016 | Rill | G10L 15/20 |
| 9,442,496 | B1 * | 9/2016 | Beckman | G10K 11/178 |
| 9,786,265 | B2 * | 10/2017 | Beckman | G10K 11/178 |
| 2009/0310793 | A1 * | 12/2009 | Ohkuri | G10L 21/0208 |
| | | | | 381/58 |
| 2010/0131269 | A1 * | 5/2010 | Park | G10K 11/178 |
| | | | | 704/233 |
| 2014/0233748 | A1 * | 8/2014 | Klug | G10K 11/178 |
| | | | | 381/71.4 |
| 2014/0270220 | A1 * | 9/2014 | Bieler | G10K 11/1788 |
| | | | | 381/71.4 |
| 2016/0012813 | A1 * | 1/2016 | Every | G10K 11/175 |
| | | | | 381/66 |

FOREIGN PATENT DOCUMENTS

| EP | 1531605 A1 | 5/2005 |
| JP | 05-80780 A | 4/1993 |
| JP | 2002-182687 A | 6/2002 |

(Continued)

OTHER PUBLICATIONS

Korean Office Action dated Apr. 20, 2017, issued in Korean Patent Application No. 10-2015-0157400.

*Primary Examiner* — Disler Paul

(74) *Attorney, Agent, or Firm* — McDermott Will & Emery LLP

(57) ABSTRACT

A noise control apparatus for vehicles includes a noise extractor for removing an output sound from an indoor sound to extract a noise, a transmitter for transmitting the noise and vehicle information, a receiver for receiving a cancellation sound corresponding to the noise and the vehicle information and a mixer for simultaneously outputting the cancellation sound and the output sound.

20 Claims, 6 Drawing Sheets

(56) References Cited

FOREIGN PATENT DOCUMENTS

| | | |
|---|---|---|
| JP | 2005-012309 A | 1/2005 |
| JP | 2008-062804 A | 3/2008 |
| JP | 2008-239099 A | 10/2008 |
| JP | 4894342 B2 | 3/2012 |
| KR | 10-1373076 B1 | 3/2014 |
| KR | 10-2015-0050855 A | 5/2015 |

* cited by examiner

APPARATUS AND METHOD FOR CONTROLLING NOISE IN VEHICLE

This application claims the benefit of priority to Korean Patent Application No. 10-2015-0157400, filed on Nov. 10, 2015 with the Korean Intellectual Property Office, which is hereby incorporated by reference as if fully set forth herein.

TECHNICAL FIELD

The present disclosure relates to a noise control apparatus and method for vehicles and, more specifically, to an apparatus and method for cancelling noise according to information, location and a driving environment of a vehicle.

BACKGROUND

People live surrounded by numerous noise sources. Examples of noise include high-level outdoor noise such as exhaust noise of vehicles or friction sounds of tires, aircraft engine noise and noises of machines in factories and indoor noise. However, it is impossible to abandon modern conveniences in order to remove noise. Accordingly, various efforts to reduce noise generated in living environments have been made.

To control noise, a method of searching for the cause of noise and then actually decreasing the noise can be adopted. The active noise control technique is a typical noise reduction method. The active noise control technique superposes a sound wave having the same magnitude as noise and a phase (−90°) opposite the noise on the noise such that the noise and sound wave cancel each other out, thereby generating a sound shadow area. That is, the active noise control technique uses superposition and destructive interference, which are physical properties of waves. The most significant feature of this technique is to selectively cancel noise of a specific frequency. However, there are many limitations on active noise control techniques since it is difficult to generate a sound wave having an opposite phase when a noise wave has multiple forms. Particularly, a problem of delay taken to detect and analyze noise and to generate a sound wave having an opposite phase has not been adequately solved. Consequently, it is difficult to completely cancel noise. To compensate for such problems, sound quality enhancement technology has been developed. This technology changes the sound wave of noise into a sound that people can hear using the principle that a sound is heard differently when the waveform of the sound, not the magnitude thereof, is changed.

Vehicle indoor noise cancellation is a typical example. While costs can be large when attempting to remove the entire noise, costs can be reduced if only a specific noise to which people sensitively respond is reduced or eliminated. A known vehicle audio speaker is a typical case to which the sound quality enhancement technology is applied to effectively block a noise of the vehicle and outdoor noise. However, it is not easy to secure noise cancellation quality since there are various causes of vehicle indoor noise and systems for solving the same become complicated.

SUMMARY

An object of the present disclosure devised to solve the problem lies in a noise control apparatus for vehicles, which can analyze noise generated when a vehicle is driven according to the cause of the noise and then selectively cancel the noise.

Another object of the present disclosure is to provide a noise control apparatus for vehicles, which can accurately remove noise by analyzing the cause of the noise and receiving a cancellation sound source corresponding to the noise through an external service connected to a vehicle through a network and improve economic efficiency of the vehicle by minimizing components mounted in the vehicle, and a network apparatus for providing noise control information to the vehicle.

The object of the present disclosure is not limited to the aforementioned, but other objects not described herein will be clearly understood by those skilled in the art from descriptions below.

In an aspect of the present disclosure to accomplish the object, a noise control apparatus for vehicles includes: a noise extractor for removing an output sound from an indoor sound to extract a noise; a transmitter for transmitting the noise and vehicle information; a receiver for receiving a cancellation sound corresponding to the noise and the vehicle information; and a mixer for simultaneously outputting the cancellation sound and the output sound.

The cancellation sound may include a plurality of sounds corresponding to causes of the noise.

The noise control apparatus for vehicles may further include a microphone for acquiring the indoor sound; and a speaker for delivering the output sound and the output of the mixer.

The vehicle information may include at least one of a position (GPS information) of the vehicle, a speed of the vehicle and specification information of the vehicle.

The cancellation sound may include at least one of a first cancellation sound reflecting noise information according to characteristics of a road in response to at least one of a position of the vehicle, the speed of the vehicle and the specification information of the vehicle, a second cancellation sound reflecting noise information according to current weather in response to the position of the vehicle, and a third cancellation sound reflecting noise information according to the speed of the vehicle and the specification information of the vehicle.

The first cancellation sound may be generated in consideration of whether the road is an asphalt road, a concrete road or an unpaved road.

The second cancellation sound may be generated in consideration of rainfall or wind velocity.

The third cancellation sound may be generated in consideration of noise generated in the vehicle according to the speed of the vehicle and the specification information of the vehicle and noise generated outside of the vehicle.

The noise control apparatus for vehicles may further include a first converter for converting the noise into a digital signal and a second converter for converting the cancellation sound into an analog signal.

The noise may be continuously delivered through the transmitter and the cancellation sound may be continuously delivered through the receiver, during activation of a noise control operation by a user.

In another aspect of the present disclosure, a network device for providing noise control information includes: a storage unit for storing a plurality of cancellation sounds corresponding to noise and vehicle information; a receiver for receiving the noise and the vehicle information from a vehicle connected through a network; a data processor for searching the plurality of cancellation sounds for information corresponding to the noise and the vehicle information; and a transmitter for delivering a result of the data processor.

The vehicle information may include at least one of a position (GPS information) of the vehicle, a speed of the vehicle and specification information of the vehicle.

The plurality of cancellation sounds may include at least one of a first cancellation sound reflecting noise information according to characteristics of a road in response to at least one of a position of the vehicle, the speed of the vehicle and the specification information of the vehicle, a second cancellation sound reflecting noise information according to current weather in response to the position of the vehicle, and a third cancellation sound reflecting noise information according to the speed of the vehicle and the specification information of the vehicle.

The first cancellation sound may be generated in consideration of whether the road is an asphalt road, a concrete road or an unpaved road, the second cancellation sound may be generated in consideration of rainfall or wind velocity, and the third cancellation sound may be generated in consideration of noise generated in the vehicle according to the speed of the vehicle and the specification information of the vehicle and noise generated outside of the vehicle.

The network device may further include a simulation unit for performing simulation to check whether the noise is cancelled using the result of the data processor.

The data processor may search for stored noise information in the time domain, corresponding to the vehicle information, and compare the noise information with the noise in the time domain.

In another aspect of the present disclosure, a noise control method for vehicles includes: removing an output sound from an indoor sound to extract a noise; transmitting the noise and vehicle information; receiving a cancellation sound corresponding to the noise and the vehicle information; and simultaneously outputting the cancellation sound and the output sound.

The vehicle information may include at least one of a position (GPS information) of the vehicle, a speed of the vehicle and specification information of the vehicle.

The cancellation sound may include at least one of a first cancellation sound reflecting noise information according to characteristics of a road in response to at least one of a position of the vehicle, the speed of the vehicle and the specification information of the vehicle, a second cancellation sound reflecting noise information according to current weather in response to the position of the vehicle, and a third cancellation sound reflecting noise information according to the speed of the vehicle and the specification information of the vehicle.

The noise and the cancellation sound may be continuously transmitted and received during activation of a noise control operation by a user.

In another aspect of the present disclosure, as embodied and broadly described herein, an apparatus for controlling a grill of a speaker in a vehicle comprises a processing system that comprises at least one data processor and at least one computer-readable memory storing a computer program. Herein, the processing system is configured to cause the apparatus to remove an output sound from an indoor sound to extract a noise, transmit the noise and vehicle information, receive a cancellation sound corresponding to the noise and the vehicle information, and simultaneously output the cancellation sound and the output sound.

The foregoing aspects of the present disclosure are merely parts of preferred embodiments of the disclosure, and various embodiments reflecting technical features of the present disclosure can be derived and understood by those skilled in the art on the basis of the following detailed description of the disclosure.

The apparatus according to the present disclosure has the following advantages.

The apparatus according to the present disclosure can receive information, which is necessary for noise cancellation when a vehicle is driven, from an external server that stores a large amount of environmental information and noise information according thereto so as to enhance noise cancellation efficiency by overcoming limitations on information that can be provided by an apparatus mounted in the vehicle.

In addition, the present disclosure can overcome limitations on the performance and storage capacity of the apparatus mounted in the vehicle, thereby reducing noise in response to various causes of noise generated when the vehicle is driven.

The effects of the present disclosure are not limited to the above-described effects and other effects which are not described herein will become apparent to those skilled in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The present disclosure will now be described in more detail with reference to the attached drawings. The term "module" used to signify components is used herein to aid in understanding of the components and thus should not be considered as having specific meanings or roles.

In a description of embodiments, it will be understood that, when an element is referred to as being "on" or "under" another element, it can be directly on or under another element or can be indirectly formed such that an intervening element is also present. In addition, terms such as "on" or "under" should be understood on the basis of the drawings.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art may be omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

Figure 1:
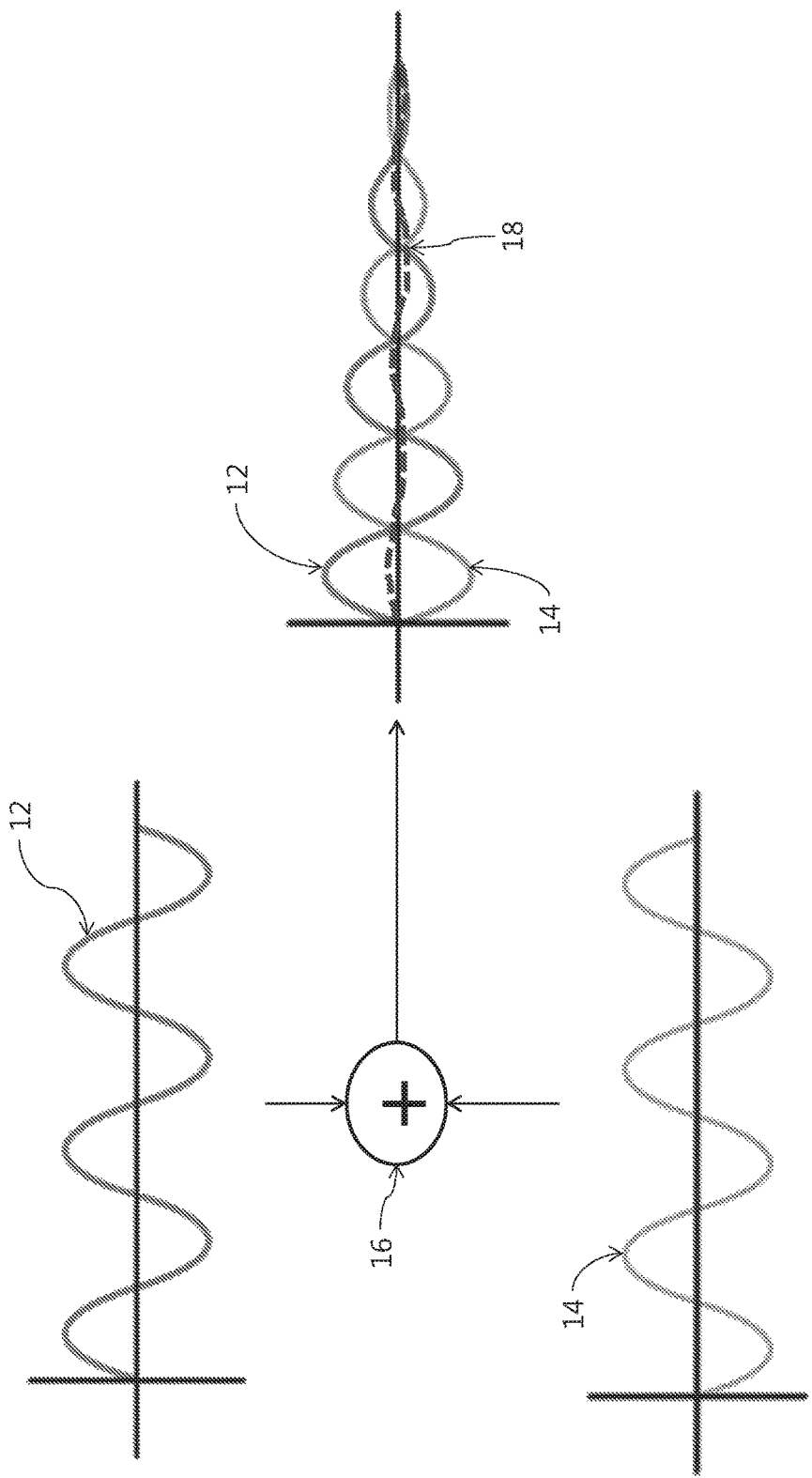
FIG. 1 illustrates an active noise control technique for vehicles according to an embodiment of the present disclosure.

FIG. 1 illustrates an active noise control technique for vehicles according to embodiments of the present disclosure.

As shown, the active noise control technique for vehicles may simultaneously output noise 12 to be cancelled and a cancellation sound 14 having the same magnitude as the noise 12 and an opposite phase (−90°) to mix the noise 12 and the cancellation sound 14 (16) inside of a vehicle. As used in this application, "noise" may refer to an undesirable noise that may be filtered, canceled or reduced. When the noise 12 and the cancellation sound 14 are simultaneously output and mixed inside of the vehicle, the noise may be cancelled out and thus the magnitude of the noise wave decreases. Accordingly, a user (driver) may hear a noise-cancelled sound 18. To use such active noise control technique for vehicles, it may be necessary to analyze the sound source of a noise and to generate a cancellation sound having a phase opposite, or substantially opposite, that of the noise to be cancelled.

Figure 2:
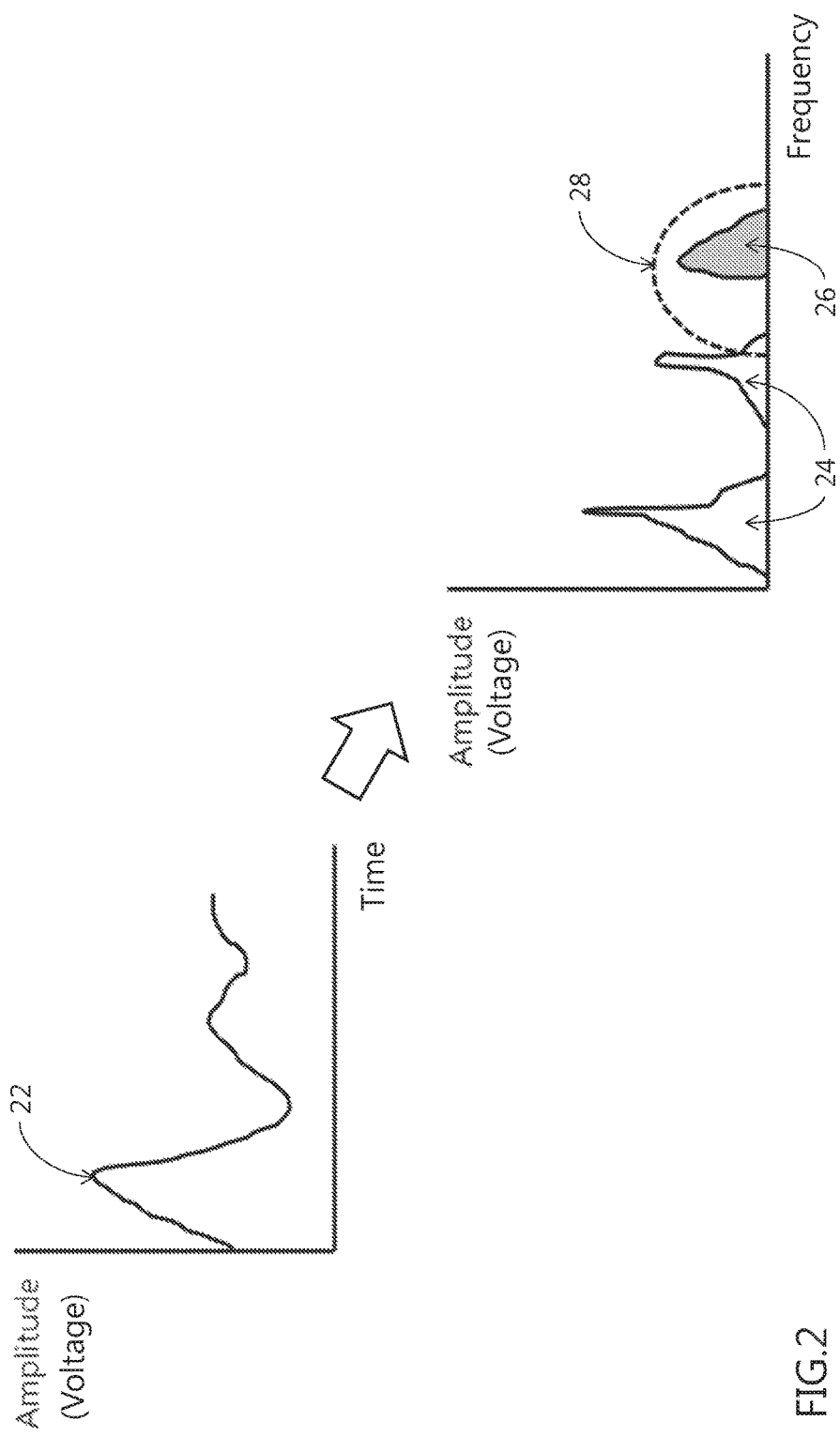
FIG. 2 illustrates a noise control technique using a filter according to an embodiment of the present disclosure.

FIG. 2 illustrates a noise control technique using a filter according to embodiments of the present disclosure.

As shown, the noise control technique using a filter may transform a sound 22 having mixed noise/sound from the time domain into the frequency domain (Fourier transform). When the sound 22 having mixed noise/sound is transformed into the frequency domain, a non-noise sound 24 and a noise sound 26 can be separated from each other. The noise sound can be removed using a frequency filter 28 which can remove a sound of a specific frequency.

However, when the frequency region which will be removed using the frequency filter 28 includes part of the non-noise sound 24, the noise control technique using a filter may remove the part of the non-noise sound 24 together with the noise sound 26. For example, the noise control technique using a filter can cause non-noise sounds such as conversation, exhaust sounds and warning sounds to be distorted.

Figure 3:
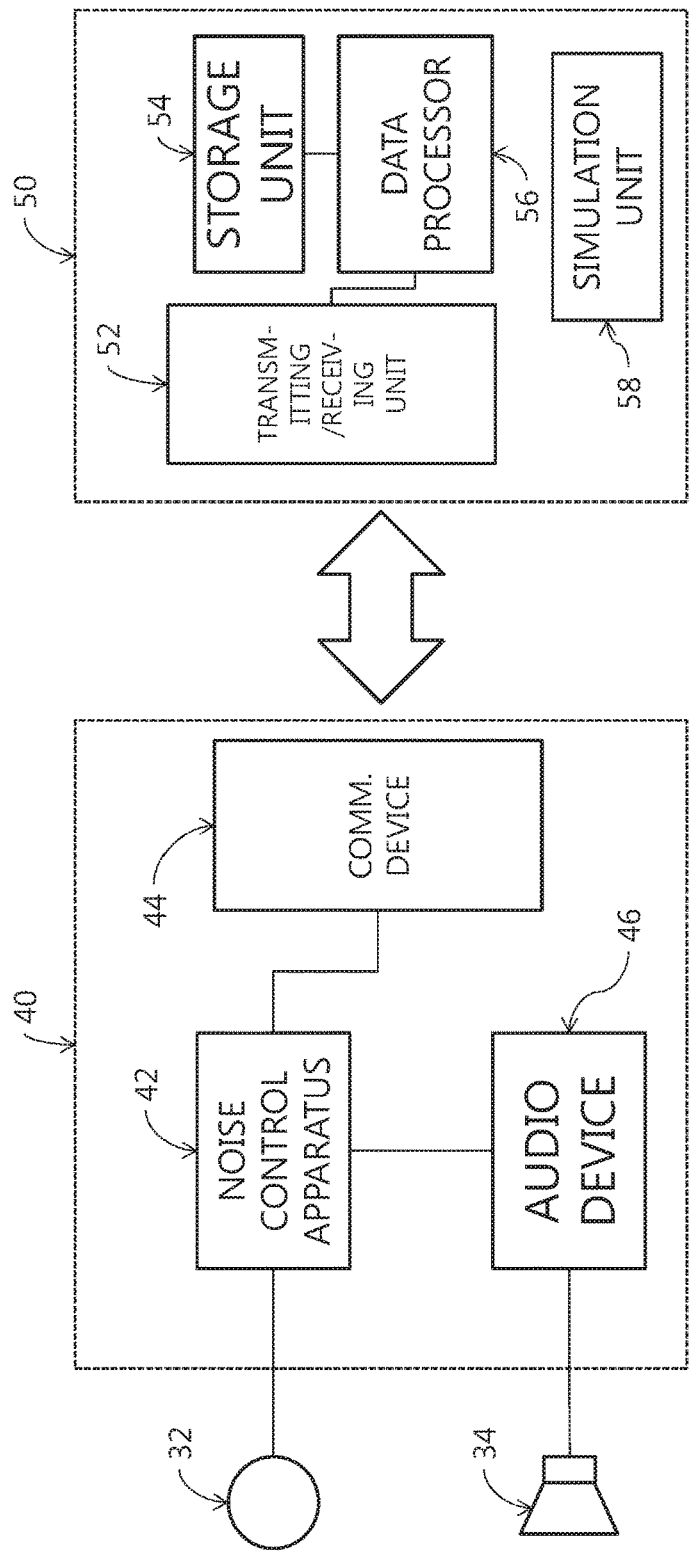
FIG. 3 illustrates a noise control system for vehicles according to an embodiment of the present disclosure.

FIG. 3 illustrates a noise control system for vehicles according to embodiments of the present disclosure.

As shown, the noise control system for vehicles may include a controller 40 for vehicles and a network server 50 which can be connected to the controller 40 through a wired/wireless network and provide noise control information.

The controller 40 for vehicles may be connected to a microphone 32 and a speaker 34 provided inside of the vehicle. Specifically, the controller 40 may include an audio device 46 connected to the speaker 34, a noise control device 42 connected to the microphone 32 and a communication device 44 connected to the noise control device 42. Although not shown, the microphone 32 and the speaker 34 may be connected to devices that implement audio, navigation and hands-free functions, which may be provided inside of the vehicle.

For example, the noise control device 42 may obtain a first sound through the microphone 32. Thereafter, the noise control apparatus 42 may receive information on a second sound, which is not the noise, output through the speaker 34 from the audio device 46. The noise control device 42 can obtain information about noise by excluding the second sound delivered from the audio device 46 from the first sound obtained through the microphone 32. The obtained noise can be delivered to the network server 50 through the communication device 44.

The information delivered from the controller 40 for vehicles to the network server 50 may include vehicle information as well as noise. Here, the vehicle information may include at least one of location (GPS information) of the vehicle, speed of the vehicle and specification information of the vehicle.

The network server 50 may include a storage unit 54 for storing a plurality of cancellation sounds corresponding to noise and vehicle information, a data processor 56 for searching the plurality of cancellation sounds for information corresponding to the noise and the vehicle information, and a transmitting/receiving unit 52 for receiving the noise and the vehicle information from the vehicle connected through a network or transmitting a result of the data processor. In addition, the network server 50 may further include a simulation unit 58 for simulating cancellation of noise using the result of the data processor 56.

The data processor 56 may search the storage unit 54 for stored noise information in the time domain, which may correspond to the vehicle information, and compare the noise information with noise in the time domain. The data processor unit 56 need not transform noise and the plurality of cancellation sounds stored in the storage unit into the frequency domain for comparison.

Here, the plurality of cancellation sounds may include at least one of a first cancellation sound that reflects noise information according to characteristics of a road in response to at least one of a location of the vehicle, a speed of the vehicle and a specification information of the vehicle, a second cancellation sound that reflects noise information in response to the current weather, and a third cancellation sound source that reflects noise information according to the speed and specifications information of the vehicle.

For example, the first cancellation sound source may be generated in consideration of whether the road is an asphalt road, a concrete road or an unpaved road. The second cancellation sound source may be generated in consideration of rainfall or wind velocity. The third cancellation sound source may be generated in consideration of noise generated in the vehicle according to a speed and specification information of the vehicle and noise generated outside of the vehicle.

Referring to FIG. 3, the noise control system for vehicles may use a large-capacity server device connected through a network, instead of an embedded system provided with an active noise control (ANC) function and mounted in a vehicle. As the noise control system for vehicles may use the server device connected through a network, instead of the embedded system, the noise control system may overcome limitations of the embedded system.

Since the embedded system may be equipped with a device for ANC provided to a restricted space of a vehicle, system performance may be restricted due to space limitations. In addition, when all devices for ANC are set in an individual vehicle, vehicle costs may increase and the devices may affect the size and weight of the vehicle. There are various types and causes of noise that can be generated while a vehicle is driven and thus an algorithm for analyzing the types and causes of noise is complicated. Accordingly, it may be difficult for the embedded system having restricted performance to generate cancellation sounds for controlling noise in response to various types and causes of noise.

If the number of environmental factors to be considered is reduced without analyzing various types and causes of noise, it may be more difficult to discriminate noises to be reduced from non-noise (conversion, warning sound, acceleration tuning sound, etc.).

However, the noise control system for vehicles, which can use a server device connected through a network, can overcome limitations, such as processing or capacity limitations, of the embedded system.

For example, operation of the noise control system for vehicles can be performed as follows.

Indoor sound of the vehicle may be obtained through the microphone 32.

Thereafter, the noise control device 42 may remove currently output sound from sound input to the microphone to extract sound with respect to indoor noise of the vehicle.

The sound with respect to the noise and vehicle information may be delivered to the network server 50 through the communication device 44.

The network server 50 may analyze the sound with respect to the noise and the vehicle information to generate a cancellation sound corresponding to the cause of the noise. Thereafter, the network server 50 may deliver the cancellation sound to the vehicle.

The cancellation sound delivered through the communication device 44 may be transmitted through the speaker 34 to cancel out the indoor noise of the vehicle. When the audio device 46 outputs a sound requested by a driver or a passenger through the speaker 34, the cancellation sound may be output simultaneously with an output of the audio device 46 and delivered through the speaker 34.

When the aforementioned method is used, the driver or passenger need not be restrained from using devices in the vehicle, such as an audio system, a navigation system and a hands-free device, in order to cancel noise generated inside of the vehicle. That is, the driver or passenger can cancel noise while using other devices in the vehicle.

Figure 4:
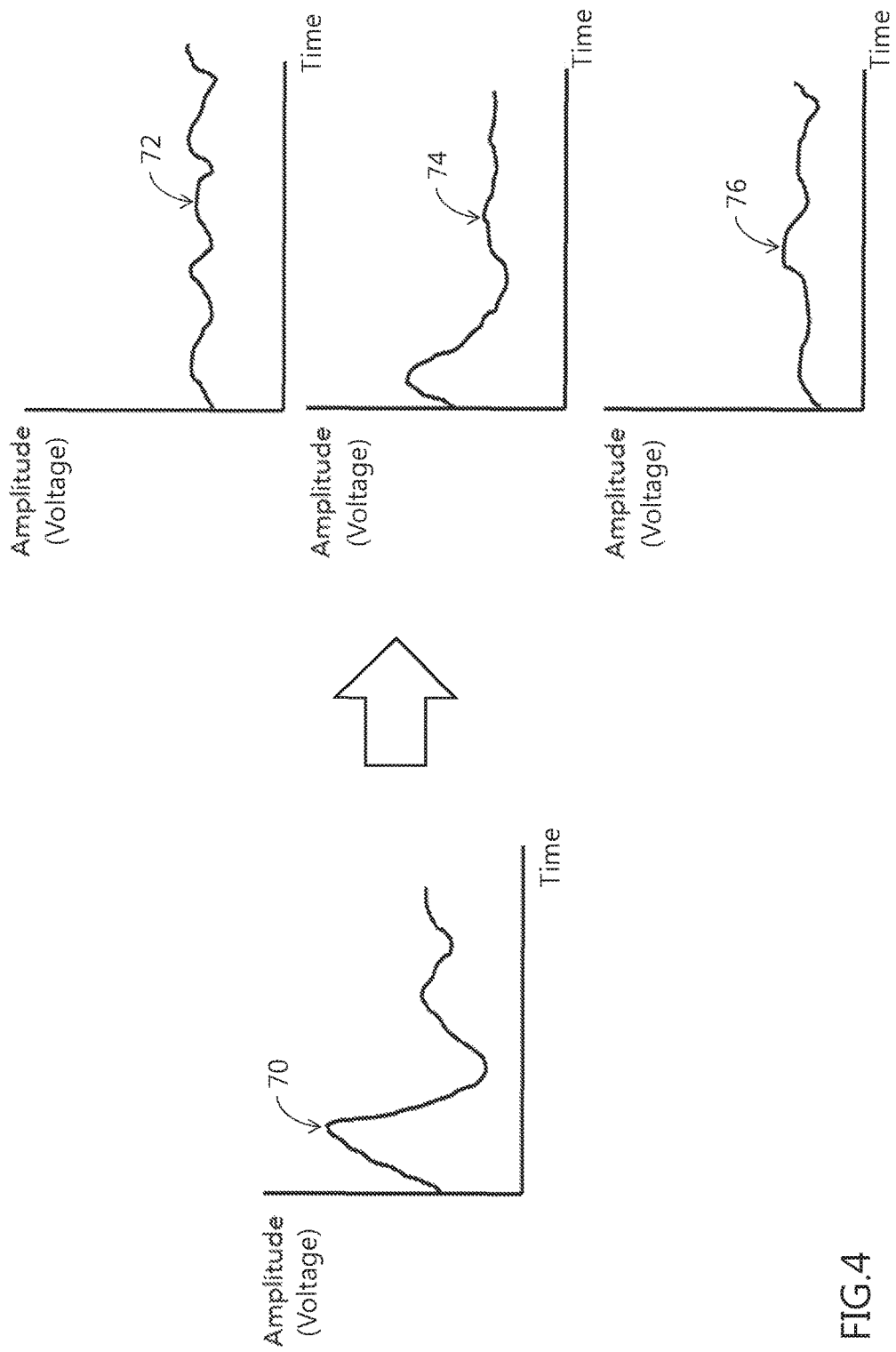
FIG. 4 illustrates noise analysis for a noise control apparatus for vehicles according to an embodiment of the present disclosure.

FIG. 4 illustrates noise analysis for the noise control system for vehicles according to embodiments of the present disclosure.

As shown, a sound 70 including noise may include road characteristic noise 72, weather characteristic noise 74 and non-noise 76. The noise control system for vehicles may use a method of selectively cancelling noise using information stored in a database, which corresponds to a vehicle state in the time domain, instead of transforming noise into the frequency domain and removing the noise.

There are various causes of noise generated when a vehicle is driven. The network server 50 (refer to FIG. 3) may include a database with respect to noise, different from the embedded system.

For example, a typical cause of noise generated when a vehicle is driven is a road state. Different types of noise are generated when the vehicle travels on an unpaved road, when the vehicle travels on an asphalt road and when the vehicle travels on a concrete road. Accordingly, such noises need to be discriminated for adequate system performance. The controller 40 for vehicles may deliver the current vehicle position (GPS information) to the network server 50. The network server 50 may recognize a road on which the vehicle is driven on the basis of the current vehicle position sent from the controller 40 for vehicles since the network server 50 may store and access road information about a predetermined area. Upon recognition of the road on which the vehicle is driven, the network server 50 may determine whether noise sent from the controller 40 for vehicles includes noise generated according to road state.

In addition, the network server 50 may obtain weather information (rain, strong winds, typhoons and the like) on the basis of the current vehicle position. The network server 50 may determine whether the noise sent from the control device 40 includes noise that can be generated according to weather using the weather information.

The vehicle information sent from the controller 40 for vehicles may include information about noise generated in the vehicle in addition to information about noise generated according to external environments of the vehicle, such as road state and weather. For example, the network server 50 may determine whether the noise sent from the controller 40 for vehicles includes noise such as wind noise generated when the vehicle is driven at a specific velocity using the model type and speed of the vehicle.

Although not shown, the network server 50 may analyze components included in the noise sent from the controller 40 for vehicles, generate cancellation sound capable of cancelling the components and perform a simulation for checking whether the noise sent from the controller 40 for vehicles can be cancelled using the cancellation sound.

Through the aforementioned analysis process, the noise control system for vehicles can construct a database using information about causes of noise that can be generated in the vehicle, analyze components included in noise delivered from the vehicle and then selectively cancel noise. Accordingly, only undesirable noise may be selectively removed without eliminating exhaust sounds, which may be artificially generated in the vehicle for the driver to feel, or perceive, acceleration of the vehicle, as well as conversation or warning sounds inside the vehicle, which correspond to non-noise.

Figure 5:
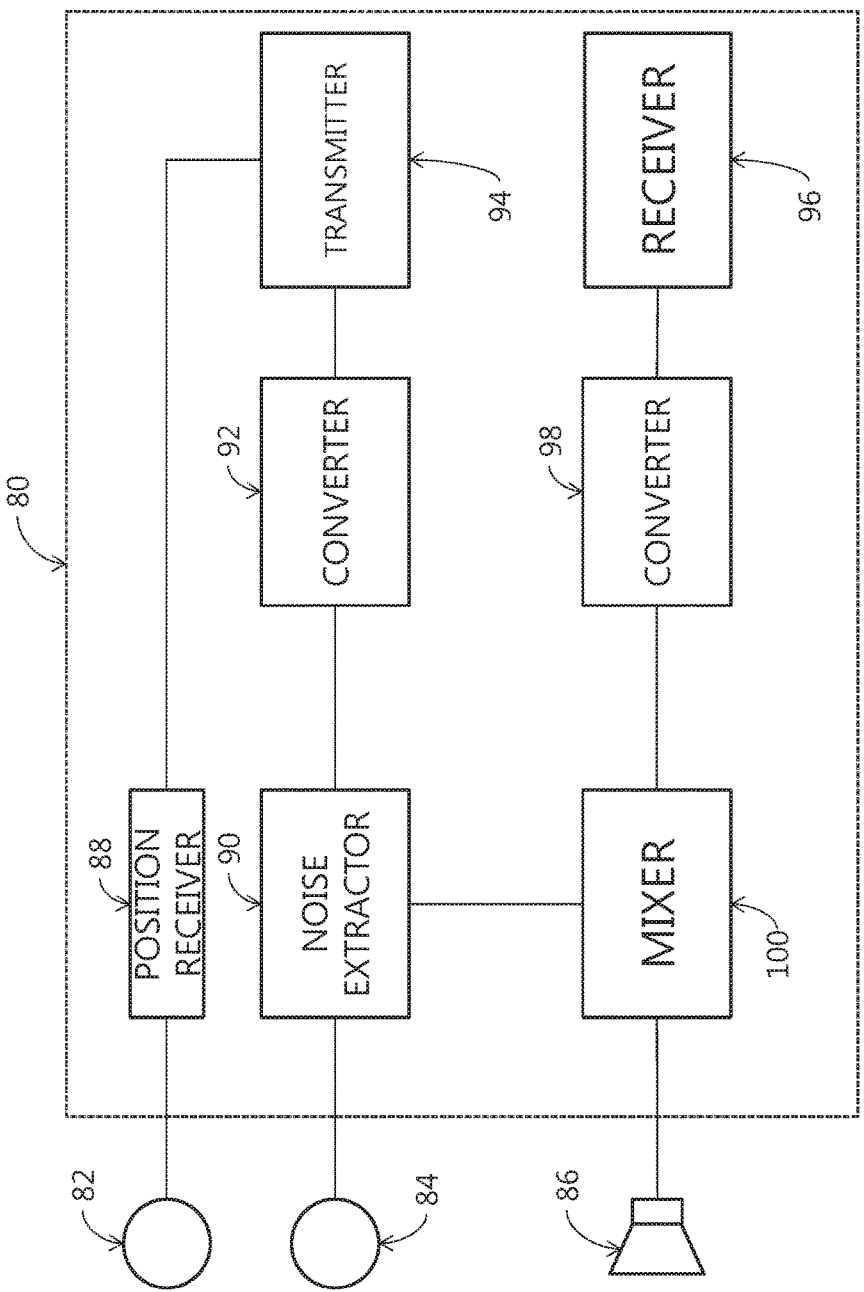
FIG. 5 illustrates a noise control apparatus for vehicles according to an embodiment of the present disclosure.

FIG. 5 illustrates a noise control apparatus for vehicles according to embodiments of the present disclosure.

As shown, the noise control apparatus 80 for vehicles may include a noise extractor 90 for removing an output sound from indoor sounds to extract noise, a transmitter 94 for transmitting the noise and vehicle information, a receiver 96 for receiving cancellation sounds corresponding to the noise and vehicle information, and a mixer 100 for simultaneously outputting the cancellation sound and the output sound. When the cancellation sound and the output sound are simultaneously output and mixed inside the vehicle, a portion of the output sound, which corresponds to the noise, may be cancelled and thus the waveform thereof is reduced. Accordingly, a user (driver) can hear noise-cancelled sound.

The noise control apparatus 80 for vehicles may further include or interwork with a microphone 84 for acquiring indoor sound and a speaker 86 for delivering the output sound and the output of the mixer.

In addition, the noise control apparatus 80 for vehicles may further include or interwork with a position receiver 88 for receiving information on the current position of the vehicle through a vehicle GPS antenna 82.

The vehicle information delivered through the transmitter 94 may include at least one of a position (GPS information) of the vehicle, a speed of the vehicle and specification information of the vehicle.

The cancellation sound delivered through the receiver 96 may include a plurality of sounds corresponding to causes of noise. Specifically, the cancellation sound may include a first cancellation sound that reflects noise information according to road characteristics in response to at least one of a position of the vehicle, a speed of the vehicle and specification information of the vehicle, a second cancellation sound that reflects noise information according to current weather in response to a position of the vehicle, and a third cancellation sound that reflects noise information according to a speed and specification information of the vehicle.

For example, the first cancellation sound may be generated in consideration of whether a road is an asphalt road, a concrete road or an unpaved road. The second cancellation sound may be generated in consideration of rainfall or wind velocity. The third cancellation sound can be generated in consideration of noise generated in the vehicle according to a speed and specification information of the vehicle and noise generated outside of the vehicle.

The noise control apparatus 80 for vehicles may further include a first converter 92 for converting noise into a digital signal and a second converter 90 for converting the cancellation sound into an analog signal. The first converter 92 may deliver the noise extracted by the noise extractor 90 to the transmitter 94 and the second converter 98 can transmit the cancellation sound delivered through the receiver 96 to the mixer 100.

During activation of a noise control operation by the user, that is, during operation of the noise control apparatus 80 for vehicles, noise generated inside of the vehicle can be continuously delivered (e.g. delivered in real time) through the transmitter 94. In addition, the cancellation sound may be continuously delivered through the receiver 96 included in the noise control apparatus 80 for vehicles.

Alternatively, the mixer 100 may mix the cancellation sound and the output sound and then output a mixed sound.

Figure 6:
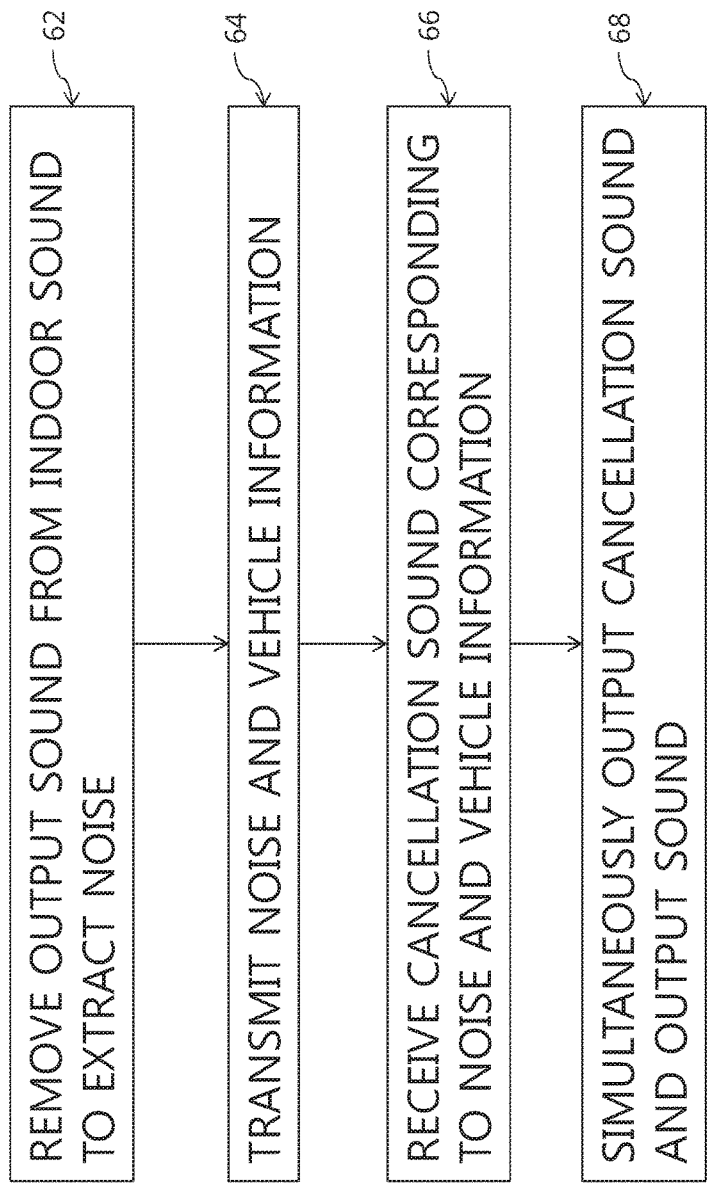
FIG. 6 illustrates a noise control method for vehicles according to an embodiment of the present disclosure.

FIG. 6 illustrates a noise control method for vehicles according to embodiments of the present disclosure.

As shown, the noise control method for vehicles may include a step 62 of removing output sound from indoor sound to extract noise, a step 64 of transmitting the noise and vehicle information, a step 66 of receiving a cancellation sound corresponding to a noise and vehicle information, and a step 68 of simultaneously outputting the cancellation sound and the output sound.

Those skilled in the art will appreciate that the present disclosure may be carried out in other specific ways than those set forth herein without departing from the spirit and essential characteristics of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A noise control apparatus for vehicles, comprising:
   a microphone for acquiring an indoor sound inside a vehicle including an output sound and a noise;
   a noise extractor, at the vehicle, for filtering the indoor sound to remove the output sound from the indoor sound and extract the noise;
   a transmitter for transmitting, from the vehicle, information about the noise and the vehicle via a wireless network;
   a receiver for receiving, at the vehicle, a cancellation sound corresponding to the noise and the vehicle via the wireless network; and
   a mixer, inside the vehicle, for simultaneously outputting the cancellation sound and the output sound,
   wherein the cancellation sound and the output sound outputted simultaneously from the mixer are mixed in indoor space of the vehicle, and
   when the cancellation sound and the output sound are mixed, a noise portion of the output sound is cancelled in indoor space of the vehicle and noise-cancelled sound is provided in indoor space of the vehicle.

2. The noise control apparatus for vehicles according to claim 1, wherein the cancellation sound includes a plurality of sounds corresponding to different causes of the noise.

3. The noise control apparatus for vehicles according to claim 1, further comprising:
   a speaker for delivering the output sound and the output of the mixer.

4. The noise control apparatus for vehicles according to claim 1, wherein the information of the vehicle includes at least one of a position (GPS information) of the vehicle, a speed of the vehicle and a specification information of the vehicle.

5. The noise control apparatus for vehicles according to claim 4, wherein the cancellation sound includes at least one of a first cancellation sound reflecting noise information according to characteristics of a road in response to at least one of the position of the vehicle, the speed of the vehicle and the specification information of the vehicle, a second cancellation sound reflecting noise information according to current weather determined in response to the position of the vehicle, and a third cancellation sound reflecting noise information according to the speed of the vehicle and the specification information of the vehicle.

6. The noise control apparatus for vehicles according to claim 5, wherein the first cancellation sound is generated in consideration of whether the road is an asphalt road, a concrete road or an unpaved road.

7. The noise control apparatus for vehicles according to claim 5, wherein the second cancellation sound is generated in consideration of rainfall or wind velocity.

8. The noise control apparatus for vehicles according to claim 5, wherein the third cancellation sound is generated in consideration of noise generated in the vehicle according to the speed of the vehicle and the specification information of the vehicle and noise generated outside of the vehicle.

9. The noise control apparatus for vehicles according to claim 1, further comprising:
   a first converter for converting the noise into a digital signal; and
   a second converter for converting the cancellation sound into an analog signal.

10. The noise control apparatus for vehicles according to claim 1, wherein the information about the noise is continuously delivered through the transmitter and the cancellation sound is continuously delivered through the receiver, during an activation of a noise control operation by a user.

11. A network server for providing noise control information into vehicles via a wireless network, comprising:
    a storage unit for storing a plurality of cancellation sounds, each corresponding to information of each noise and each vehicle;
    a receiver for receiving information, from a vehicle, about a noise and the vehicle, the vehicle being connected through the wireless network, wherein the noise is extracted, at the vehicle, by removing an output sound from an indoor sound in the vehicle;
    a data processor for searching the plurality of cancellation sounds, stored in the storage unit, in response to the information of the noise and the vehicle delivered from the vehicle; and
    a transmitter for delivering a search result of the data processor into the vehicle via the wireless network,
    wherein the cancellation sound is mixed with output sound of the vehicle in indoor space of the vehicle, and when the cancellation sound and the output sound are mixed, a noise portion of the output sound is cancelled in indoor space of the vehicle and noise-cancelled sound is provided in indoor space of the vehicle.

12. The network server for providing noise control information according to claim 11, wherein the information about the vehicle includes at least one of a position (GPS information) of the vehicle, a speed of the vehicle and a specification information of the vehicle.

13. The network server for providing noise control information according to claim 12, wherein the plurality of cancellation sounds includes at least one of a first cancellation sound reflecting noise information according to characteristics of a road in response to at least one of the position of the vehicle, the speed of the vehicle and the specification information of the vehicle, a second cancellation sound reflecting noise information according to current weather in response to the position of the vehicle, and a third cancellation sound reflecting noise information according to the speed of the vehicle and the specification information of the vehicle.

14. The network server for providing noise control information according to claim 13, wherein the first cancellation sound is generated in consideration of whether the road is an asphalt road, a concrete road or an unpaved road, the second cancellation sound is generated in consideration of rainfall or wind velocity, and the third cancellation sound is generated in consideration of noise generated in the vehicle according to the speed of the vehicle and the specification information of the vehicle and noise generated outside of the vehicle.

15. The network server according to claim 11, further comprising a simulation unit for performing simulations to check whether the noise is cancelled using the result of the data processor.

16. The network server according to claim 11, wherein the data processor searches for stored noise information in the time domain, corresponding to the information about the vehicle, and compares the noise information with the noise in the time domain.

17. A noise control method for vehicles, comprising:
acquiring, at a vehicle, an indoor sound including an output sound and a noise;
filtering, at the vehicle, the indoor sound to remove the output sound from the indoor sound and extract the noise;
transmitting, from the vehicle, the information about noise and a vehicle via a wireless network;
receiving, at the vehicle, a cancellation sound corresponding to the information about noise and the vehicle via the wireless network; and
simultaneously outputting, inside the vehicle, the cancellation sound and the output sound,
wherein the cancellation sound and the output sound outputted simultaneously are mixed in indoor space of the vehicle, and
when the cancellation sound and the output sound are mixed, a noise portion of the output sound is cancelled in indoor space of the vehicle and noise-cancelled sound is provided in indoor space of the vehicle.

18. The noise control method for vehicles according to claim 17, wherein the information about the vehicle includes at least one of a position (GPS information) of the vehicle, a speed of the vehicle and a specification information of the vehicle.

19. The noise control method for vehicles according to claim 18, wherein the cancellation sound includes at least one of a first cancellation sound reflecting noise information according to characteristics of a road in response to at least one of the position of the vehicle, the speed of the vehicle and the specification information of the vehicle, a second cancellation sound reflecting noise information according to current weather in response to the position of the vehicle, and a third cancellation sound reflecting noise information according to the speed of the vehicle and the specification information of the vehicle.

20. The noise control method for vehicles according to claim 17, wherein the information about the noise and the cancellation sound are continuously transmitted and received during activation of a noise control operation by a user.

* * * * *